(12) United States Patent
Porter, Sr.

(10) Patent No.: US 8,766,500 B2
(45) Date of Patent: Jul. 1, 2014

(54) SYSTEM AND METHOD FOR POWER PURIFYING

(76) Inventor: James M. Porter, Sr., Hudson, NH (US)

( * ) Notice: Subject to any disclaimer, the term of this patent is extended or adjusted under 35 U.S.C. 154(b) by 411 days.

(21) Appl. No.: 13/192,309

(22) Filed: Jul. 27, 2011

(65) Prior Publication Data

US 2012/0025650 A1    Feb. 2, 2012

Related U.S. Application Data

(60) Provisional application No. 61/368,372, filed on Jul. 28, 2010.

(51) Int. Cl.
*H02K 47/00*         (2006.01)

(52) U.S. Cl.
USPC .......................................... 310/113; 310/112

(58) Field of Classification Search
USPC .......................... 310/112, 113, 114, 103, 152
See application file for complete search history.

(56) References Cited

U.S. PATENT DOCUMENTS

| | | | |
|---|---|---|---|
| 3,523,204 A * | 8/1970 | Rand | 310/94 |
| 5,880,548 A * | 3/1999 | Lamb | 310/103 |
| 6,388,347 B1 | 5/2002 | Blake et al. | |
| 6,998,723 B2 * | 2/2006 | Kong et al. | 290/1 C |
| 7,024,963 B2 * | 4/2006 | French | 74/665 F |
| 2007/0262666 A1 | 11/2007 | Wise | |

FOREIGN PATENT DOCUMENTS

| | | |
|---|---|---|
| KR | 1020050095620 A | 9/2005 |
| KR | 1020070104328 A | 10/2007 |
| KR | 100805011 B1 | 2/2008 |

* cited by examiner

*Primary Examiner* — Hanh Nguyen
(74) *Attorney, Agent, or Firm* — Hayes Soloway P.C.

(57) ABSTRACT

A system and method for power purification is provided. The system contains a power source. A motor is connected to the power source. A plurality of rotating elements is provided, each rotatable about a primary axis, wherein each of the plurality of rotating elements supports at least one magnet, wherein each of the magnets is located along a common plane. A first rotating element of the plurality of rotating elements is mechanically connected to the motor. At least one flywheel element is mechanically connected to each of the plurality of rotating elements. At least one output device is mechanically connected to at least one of the plurality of rotating elements.

14 Claims, 10 Drawing Sheets

US 8,766,500 B2

SYSTEM AND METHOD FOR POWER PURIFYING

CROSS REFERENCE TO RELATED APPLICATION

This application claims benefit of U.S. Provisional Application Ser. No. 61/368,372 entitled, "System and Method for Power Purifying System," filed Jul. 28, 2010, the entire disclosure of which is incorporated herein by reference.

FIELD OF THE DISCLOSURE

The present disclosure is generally related to power systems, and more particularly is related to a power purification system and method thereof.

BACKGROUND OF THE DISCLOSURE

Power distribution systems depend on many different parts. Various loads on the distribution system can alter the power factor of the power being distributed. Relays and transformers can send spikes of voltage into the system as the distribution system switches load patterns. The various activity that can occur in power distribution systems can have a negative impact on the electronics of an individual operating off of the power distribution system. Fault protectors, capacitor banks, and various other electronic systems operate to mitigate the negative impact, but are generally inexact solutions. Thus, additional protection devices are required for individual users to protect their electronics from the negative impact of diminished power factor and spikes in the power distribution system.

Additionally, some battery chargers use a pulse source in which a series of voltage or current pulses is fed to the battery. A pulse source works with any size, voltage, capacity or chemistry of batteries, including automotive batteries. With pulse charging, high instantaneous voltages can be applied without overheating the battery. In a lead-acid battery, pulse charging breaks down lead-sulfate crystals, which has been known to extend the battery service life. Pulse charging is also believed to recharge a battery faster than a constant power. However, most power sources do not offer power in a pulse-wave form. Devices are needed that can convert a constant power source to a pulse-wave source for battery charging, particularly in the automotive field and other fields that utilize batteries of significant size.

Thus, a heretofore unaddressed need exists in the industry to address the aforementioned deficiencies and inadequacies.

SUMMARY OF THE DISCLOSURE

Embodiments of the present disclosure provide a system and method for purifying power. Briefly described, in architecture, one embodiment of the system, among others, can be implemented as follows. The system contains a power source. A motor is connected to the power source. A plurality of rotating elements is provided, each rotatable about a primary axis, wherein each of the plurality of rotating elements supports at least one magnet, wherein each of the magnets is located along a common plane. A first rotating element of the plurality of rotating elements is mechanically connected to the motor. At least one flywheel element is mechanically connected to each of the plurality of rotating elements. At least one output device is mechanically connected to at least one of the plurality of rotating elements.

The present disclosure can also be viewed as providing methods for purifying power. In this regard, one embodiment of such a method, among others, can be broadly summarized by the following steps: receiving input power; rotating a first rotating element of a plurality of rotating elements in a first rotational direction with at least a portion of the received input power, wherein each of the plurality of rotating elements rotates about a primary axis, and wherein each of the plurality of rotating elements supports at least one magnet, wherein each magnet is located along a common plane; propelling rotation of the first rotating element with a flywheel element mechanically connected to the first rotating element; transferring a quantity of rotational energy from one of the rotating elements to an output device; and converting the quantity of transferred rotational energy into a quantity of output power.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale. Instead emphasis is being placed upon illustrating clearly the principles of the present disclosure. Moreover, in the drawings, like reference numerals designate corresponding parts throughout the several views.

DETAILED DESCRIPTION

Figure 1:
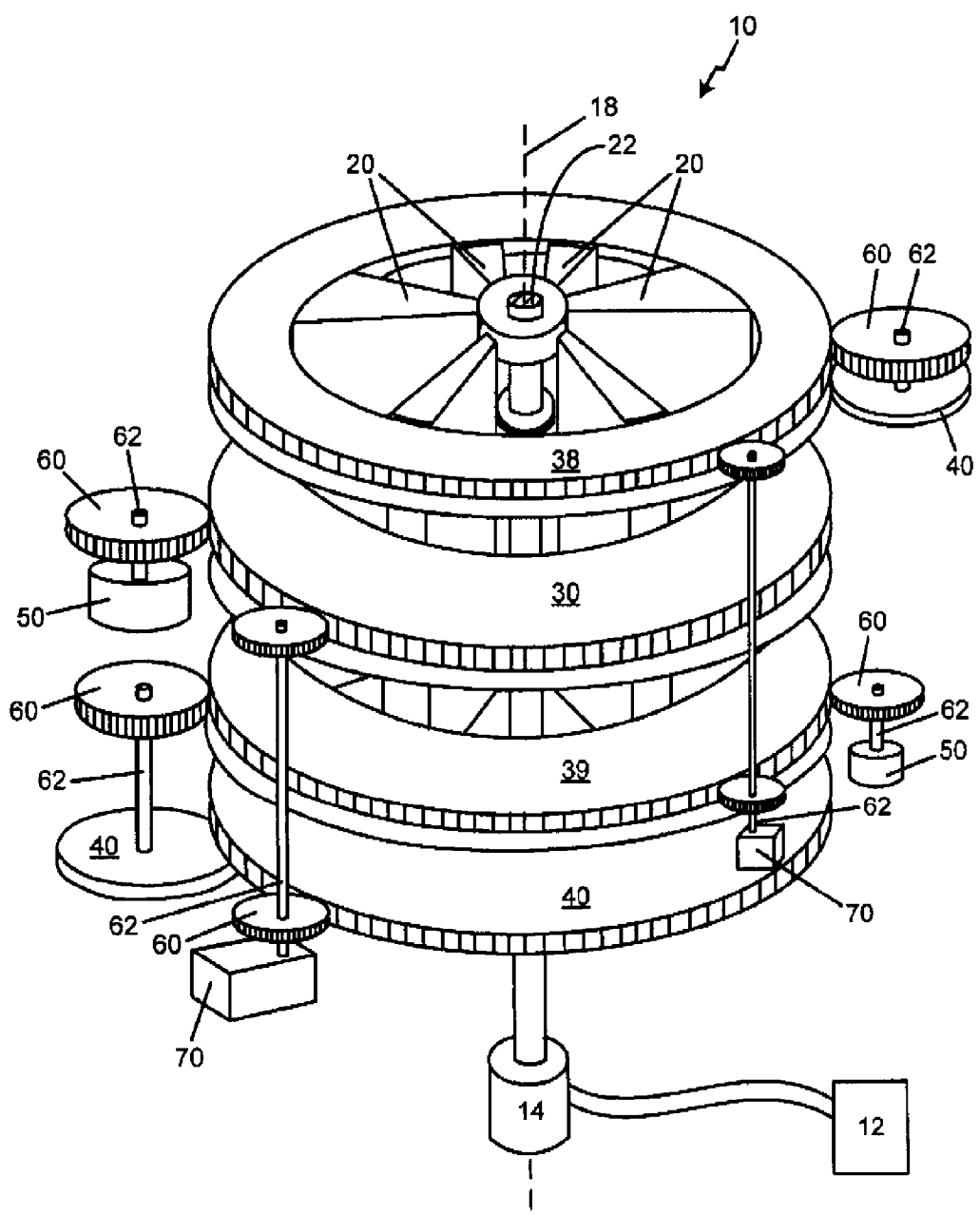
FIG. 1 is a plan view illustration of a system for purifying power, in accordance with a first exemplary embodiment of the present disclosure.

FIG. 1 is a plan view illustration of a system for purifying power 10, in accordance with a first exemplary embodiment of the present disclosure. The system for purifying power 10, which may be referred to as, 'system 10' includes a power source 12 and a motor 14 connected to the power source 12. A plurality of rotating elements 30, 38, 39 are provided, each of which is rotatable about a primary axis 18. Each of the plurality of rotating elements 30, 38, 39 supports at least one magnet 20. Each of the magnets 20 is positioned along a common plane. A first rotating element 30 of the plurality of rotating elements 30, 38, 39 is mechanically connected to the motor 14. At least one flywheel element 40 is mechanically connected to each of the plurality of rotating elements 30, 38, 39. At least one output device 50 is mechanically connected to at least one of the plurality of rotating elements 30, 38, 39.

The power source 12 may include any type of power source, such as electrical power from a wall outlet, a feed from a power distribution system, a battery, or some other feed from a standard commercial electric grid. The power source 12 may also be a non-electrical source, such as solar power, wind power, hydroelectric power, or wave power, all of which are considered within the scope of the present disclosure. The power source 12 may be anything that provides enough power to the motor 14 to sufficiently run the motor 14. The motor 14 may include a variety of different types of motors, including any type of size of electrical drive motor. The motor 14 may be a commercially available product that converts the input power from the power source 12 to mechanical energy, rotating at least one of the rotating elements 30, 38, 39. Additionally, either the power source 12 and/or the motor 14 may be configured to operate in intervals, such as with pulsing electrical signals or intermittent rotational movement from the motor 14.

As is shown in FIG. 1, the plurality of rotating elements 30, 38, 39 may include three rotating elements 30, 38, 39, or any other number of rotating elements. In may be preferable to provide the rotating elements 30, 38, 39 in groups of three. For example, providing three, six, nine, or twelve, etc. rotating elements 30, 38, 39 may be more beneficial than providing seven or eleven rotating elements. Each of the rotating elements 30, 38, 39 is rotatable about a primary axis 18, such that each of the rotating elements 30, 38, 39 rotates in parallel planes to one another about the primary axis 18. Each of the plurality of rotating elements 30, 38, 39 support at least one magnet 20, but preferably two magnets 20. The magnet or magnets 20 may supported by the rotating element 30, 38, 39 in a variety of ways such as through direct support or use of a supporting structure, as is discussed further with respect to the additional figures.

As is shown in FIG. 1, the rotating elements 30, 38, 39 may include a layered structure with abutting discs. For example, the first rotating element 30 may include a first structure with gear teeth located on the exterior surface of the first structure, wherein the gear teeth may interface with another component of the system 10, such as a flywheel element 40 or output device 50. Abutting the first structure may be a second structure, which is also disc-like in shape, but does not have gear teeth. In FIG. 1, each of the plurality of rotating elements 30, 38, 39 are illustrated with the first structure abutting the second structure. The second structure may provide structural benefits to the rotating elements 30, 38, 39, such as by providing a larger mass for sufficient rotational energy. Other structures may also be included with the rotating elements 30, 38, 39, all of which are considered within the scope of the present disclosure.

At least one of the plurality of rotating elements 30, 38, 39—a first rotating element 30—is mechanically connected to the motor 14. Commonly, this mechanical connection is achieved through a center axle 22, which is connected to the motor 14 and traverses along the primary axis 18. The first rotating element 30 may be mechanically connected to this center axle 22, such that when the center axle 22 rotates, the first rotating element 30 is rotated. Flywheel elements 40 are connected to various rotating elements 30, 38, 39 of the system 10. Commonly, each of the plurality of rotating elements 30, 38, 39 is connected to an independent flywheel element 40, however, two or more of the rotating elements 30, 38, 39 may be connected to one common flywheel element 40. A clutch gear 70 may be connected to the rotating elements 30, 38, 39. The output device 50 may include any number of output devices 50, such as one for each of the rotating elements 30, 38, 39. The output device 50 may be a generator or other system capable of converting the rotational energy of the rotating elements 30, 38, 39 into an electrical output power. The flywheel element 40, the output device 50 and the clutch gear 70 may all be mechanically connected to the rotating elements 30, 38, 39 with any number of gears 60 and shafts 62.

Figure 2:
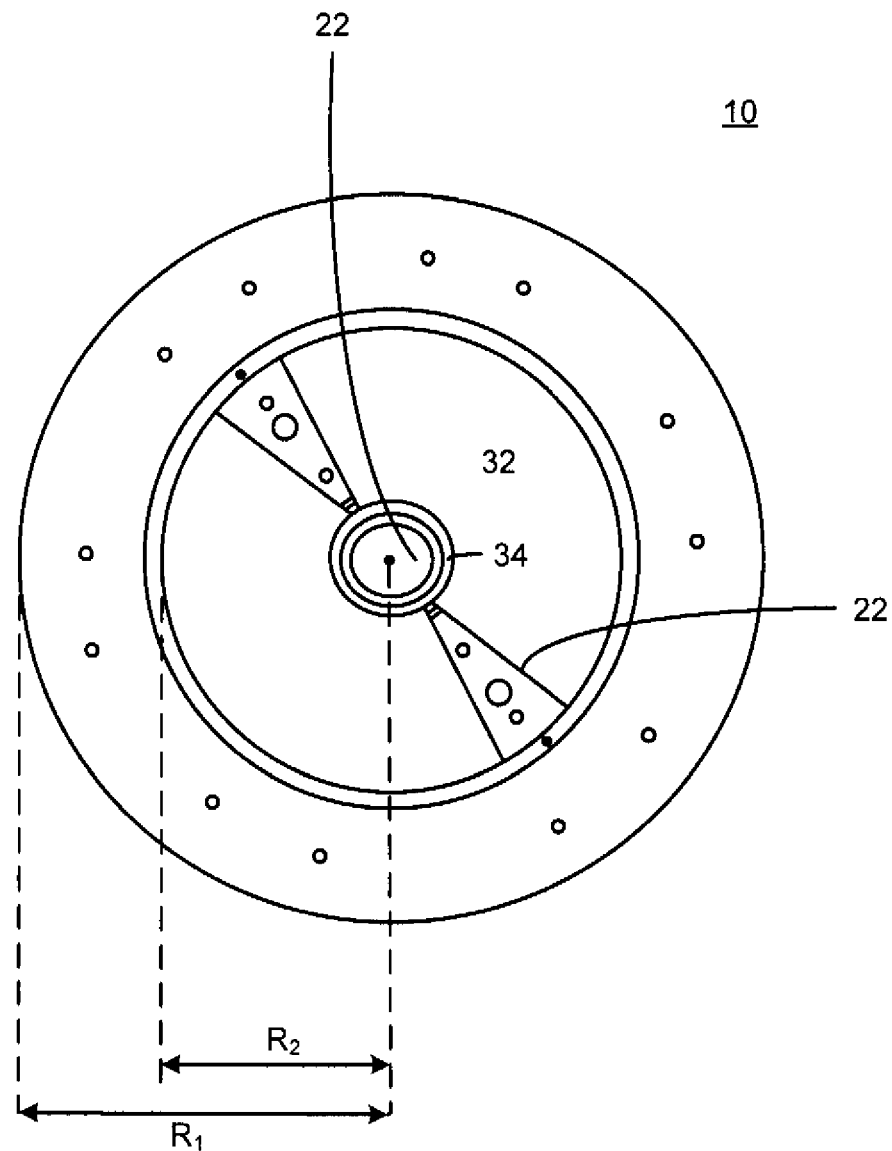
FIG. 2 is a top view illustration of a first rotating element of the system for purifying power, in accordance with the first exemplary embodiment of the present disclosure.

FIG. 2 is a top view illustration of the first rotating element 30 of the system for purifying power 10, in accordance with the first exemplary embodiment of the present disclosure. Specifically, in FIG. 2, the primary axis 18 is oriented to pass through the plane of the page. With reference to both FIGS. 1 and 2, the first rotating element 30, or any of the other rotating elements 38, 39 may include a variety of rotating structures, such as a substantially planar disc having an exterior radius $R_1$ and an interior radius $R_2$. An open interior portion 32 is formed within, and defined by, the interior radius $R_2$, whereas the exterior radius $R_1$ may define the exterior surface of the first rotating element 30. At the center of the first rotating element 30, a center hub 34 may be provided to interface the first rotating element 30 with a center axle 22.

The center hub 34 may be connected to the center axle 22 in a variety of ways, including a mechanical connection where the first rotating element 30 is rotatably connected to the center axle 22, or with a non-rotatable connection. When the center hub 34 is mechanically connected to the center axle 22, the first rotating element 30 and magnets 20 may be rotated by a rotation of the center axle 22. When the center hub 34 has a non-rotatable connection with the center axle 22, the rotating elements 30, 38, 39 and magnets 20 may be supported by the center axle 22, but may be free to rotate independent of any rotation of the center axle 22. For example, the center hub 34 may include a bearing or other device to facilitate the non-rotatable connection with the center axle 22. This configuration allows rotational movement of the rotating elements 30, 38, 39 and/or a non-rotatably binding support of the rotating element to be transferred from the center hub 34, through the magnets 20, and to the rotating element 30, 38, 39.

The magnet or magnets 20 supported by the rotating element 30, 38, 39 may be located within the interior portion 32 and between the center hub 34 and the rotating elements 30, 38, 39. The magnets 20 may be connected to both the center hub 34 and the rotating elements 30, 38, 39, thereby forming a substantially unitary structure. As is shown in FIG. 2, the magnets 20 may be shaped to fit within the interior portion 32. This may include magnets 20 with a substantially triangular shape whereby one side of the magnet 20 has a greater width than the other side of the magnet 20. The magnet or magnets 20 that are supported by the rotating elements 30, 38, 39 may be located within the interior portion 32 of the rotating elements 30, 38, 39.

Figure 3:
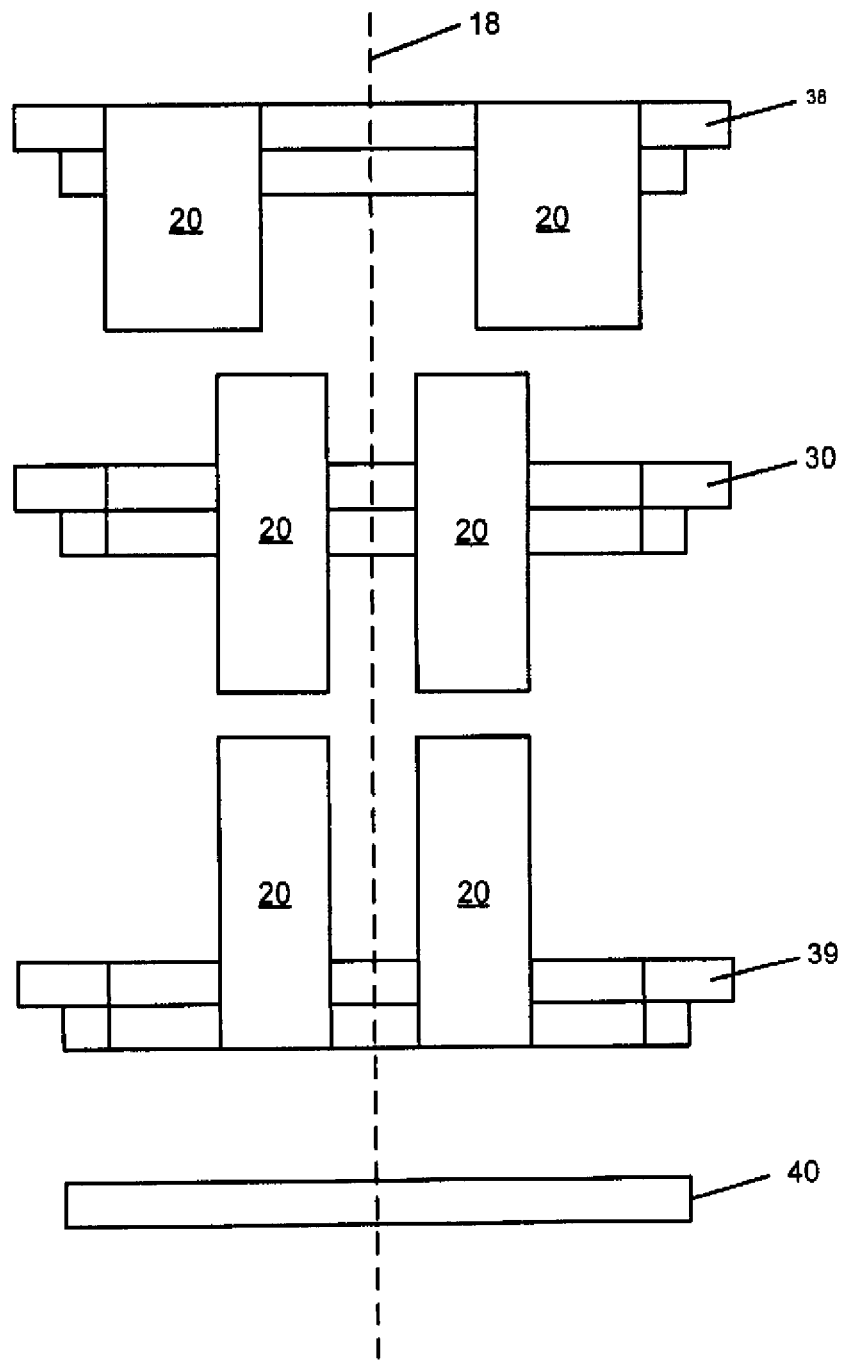
FIG. 3 is an exploded cross-sectional illustration of the system for purifying power, in accordance with the first exemplary embodiment of the present disclosure.

FIG. 3 is an exploded cross-sectional illustration of the system for purifying power 10, in accordance with the first exemplary embodiment of the present disclosure. The rotating elements 30, 38, 39 of FIG. 3 are illustrated exploded along primary axis 18 from their positions within the system 10. For clarity, the rotating elements 30, 38, 39 are further defined as a first rotating element 30, a upper rotating element 38 positioned above the first rotating element 30, and a lower rotating element 39 positioned below the first rotating element 30. Of course, any other number of rotating elements 30, 38, 39 may be included, but only three are provided herein for clarity of disclosure. The system 10 further includes a flywheel element 40 located below the lower rotating element 39. All of the rotating elements 30, 38, 39 and the flywheel element 40 are positioned to rotate about the primary axis 18.

Each of the rotating elements 30, 38, 39 is illustrated is supporting two magnets 20, each of which is mechanically connected or affixed to one of the rotating elements 30, 38, 39, respectively. Preferably, the magnets 20 included with the system 10 are approximately the same height, such that when the rotating elements 30, 38, 39 are positioned proximate to each other, the upper surfaces and the lower surfaces of all of the magnets 20 are approximately even. This may be characterized as the magnets 20 being positioned along the same plane, or substantially the same plane, as determined from an upper magnet surface or a lower magnet surface. Other designs with varying magnet 20 heights and non-even surfaces are also within the scope of the present disclosure. As is shown, each of the rotating elements 30, 38, 39 is supporting the two magnets 20 in a different configuration from other rotating elements 30, 38, 39.

For example, the upper rotating element 38 supports two magnets 20 such that the top of the magnets 20 is approximately flush with the upper surface of the upper rotating element 38, and the lower surface of the magnets 20 extends below the upper rotating element 38. With the first rotating element 30, the magnets 20 may be positioned such that an equal portion of the magnets 20 is on either side of the first rotating element 30. With the lower rotating element 39, the magnets 20 may be positioned such that the lower surface of the magnets 20 is approximately flush with the lower surface of the lower rotating element 39. Thus, as can be seen, each of the magnets 20 may be positioned along the same plane, or substantially the same plane.

Figure 4:
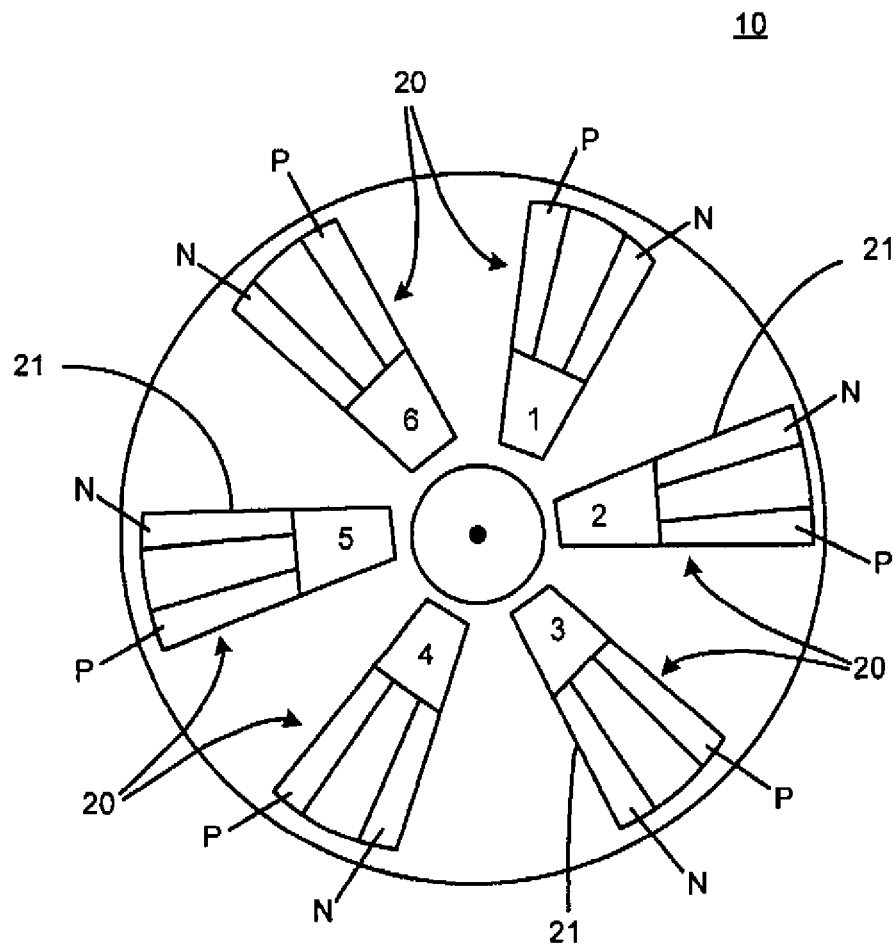
FIG. 4 is a cross-sectional illustration of the magnets of the system for purifying power, in accordance with the first exemplary embodiment of the present disclosure.

FIG. 4 is a cross-sectional illustration of the magnets 20 of the system for purifying power 10, in accordance with the first exemplary embodiment of the present disclosure. Each of the magnets 20 shown in FIG. 4 is positioned in a specific location, which is identified by a number of one to six. Accordingly, magnets 20 occupy the different positions with respect to one another based on the rotating elements 30, 38, 39 they are supported by. Commonly, each of the three rotating elements 30, 38, 39 supports two magnets 20 which are rotationally spaced 180° on center. For example, the magnet 20 in position 1 and opposing magnet 20 in position 4 are both supported by the upper rotating element 38. The magnet 20 in position 2 and opposing magnet 20 in position 5 are both supported by the first rotating element 30. And, the magnet 20 in position 3 and opposing magnet 20 in position 6 are both supported by the lower rotating element 39. As the system 10 is used, the spacing and distance between each magnet 20 and another magnet 20 may change, but the relative position of each of the magnets 20 may remain constant.

Figure 5:
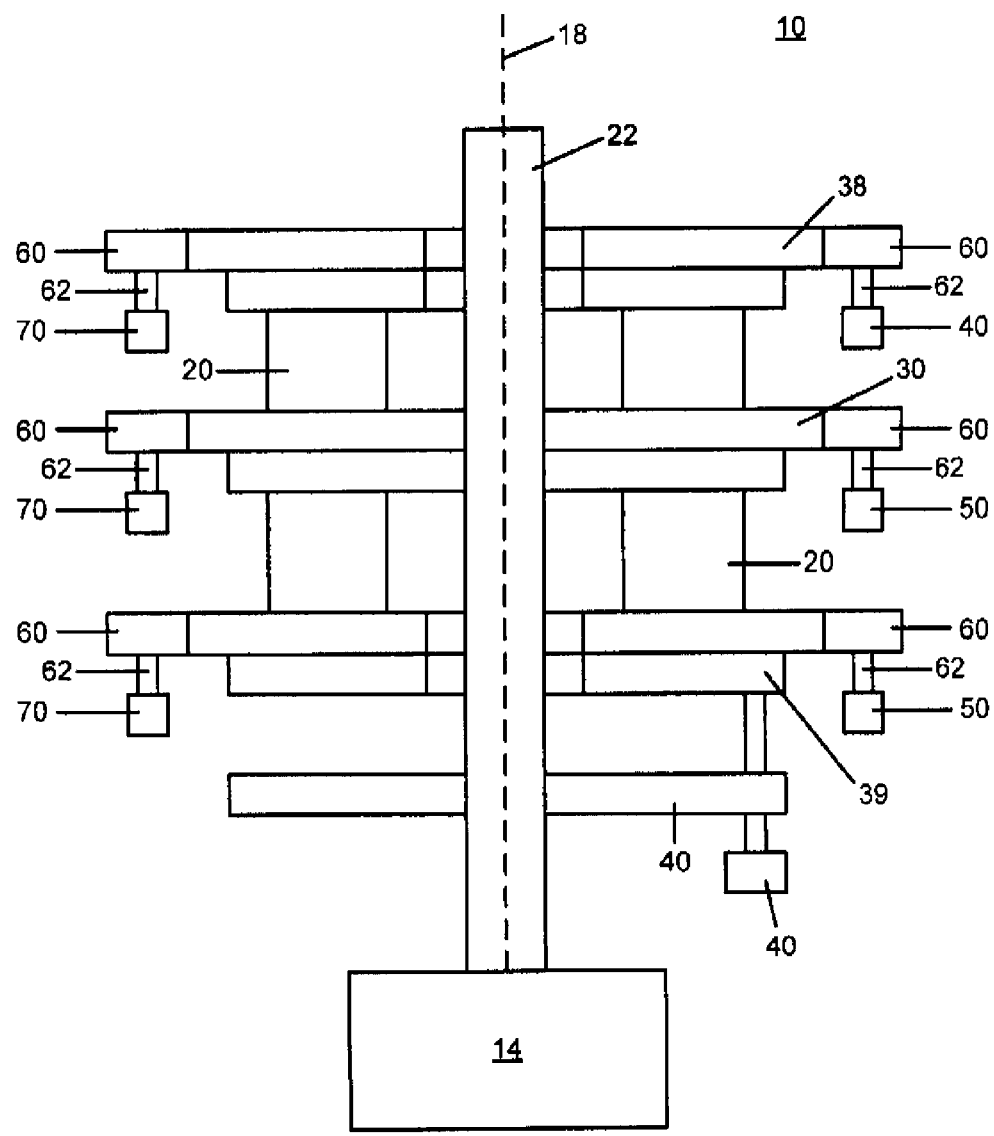
FIG. 5 is a cross-sectional illustration of the system for purifying power, in accordance with the first exemplary embodiment of the present disclosure.

The magnets 20 may have any shape and may be supported by the rotating elements 30, 38, 39 with a holding structure 21. In FIG. 4, the magnets 20 are illustrated as being within a holding structure 21, which may be affixed between the center hub 34 and the rotating elements 30, 38, 39. Regardless of whether the magnets 20 are in a holding structure 21 or supported directly by the rotating elements 30, 38, 39, each of the magnets 20 included with the system 10 may include two opposing poles: a positive pole (P) and a negative pole (N). These poles are indicative of the magnetic force created by the magnets 20, as is well known within the art. The magnets 20 are positioned in the system 10 such that like poles are opposing each other. In other words, the each positive pole opposed another positive pole, and each negative pole opposed another negative pole. This configuration may allow the system 10 to increase a repelling force between two magnets 20 by decreasing the space between the two magnets 20. This utilizes the magnetic repelling force between the like poles, which may transfer into the rotating elements 30, 38, 39 that a magnet 20 is supported by. This may be used to increase a rotation of at least one of the rotating elements 30, 38, 39, as is described further herein FIG. 5 is a cross-sectional illustration of the system for purifying power 10, in accordance with the first exemplary embodiment of the present disclosure. In contrast to FIG. 3, FIG. 5 illustrates the system 10 with the rotating elements 30, 38, 39 and magnets 20 in an assembled position. As can be seen, each of the two magnets 20 that are connected to each of the first rotating element 30, the upper rotating element 38, and the lower rotating element 39, respectively, are all positioned approximately along the same plane, generally between the upper surface of the upper rotating element 38 and the lower surface of the lower rotating element 39. This configuration allows the magnets 20 connected to each of the rotating elements 30, 38, 39 to be positioned proximate to one another, such that a movement of one magnet 20 may result in a movement of other magnets 20, due to the magnetic forces therebetween.

It can also be seen that the upper and lower rotating elements 38, 39 are not mechanically connected to the center axle 22, whereas the first rotating element 30 is mechanically connected to the center axle 22 (as indicated by the gap and lack of gap, respectively, between the rotating elements 30, 38, 39 and the center axle 22). When the motor 14 engages, it may transfer a rotational force through the center axle 22, which may rotate the first rotating element 30. However, the center axle 22 will not turn the upper and lower rotating elements 38, 39 since they are rotatable independent of the center axle 22, and only supported by the center axle 22.

In use, activation of the motor 14 and movement of the center axle 22 will rotate the first rotating element 30. Rotation of the first rotating element 30 will move the two magnets 20 that are supported by the first rotating element 30. Accordingly, the faces of the magnets 20 will move closer to the like-poled face of a proximately positioned magnet 20, which increases the repelling force between the two magnets 20. The magnet 20 on the first rotating element 30 approaches the magnets 20 of the upper and lower rotating elements 38, 39 and, before contact between the magnets 20 can be realized, the upper and lower rotating elements 38, 39 are caused to rotate in the same direction as the first rotating element 30. In other words, the repelling force between the magnets 20 may move the magnets 20 that are supported by the upper and lower rotating elements 38, 39, which, in turn, may rotate the upper and lower rotating elements 38, 39. Thus, activation of the motor 14 may ultimately result in movement of all of the rotating elements 30, 38, 39.

Also shown in FIG. 5 are the flywheel elements 40. The flywheel elements 40 may be characterized as a mechanical capacitor, which carry forward a rotational momentum of the rotating elements 30, 38, 39. The system 10 may include one of the flywheel elements 40 positioned below the lower rotating element 39, and mechanically connected or rigidly mounted to the first rotating element 30 via the center axle 22. Other flywheel elements 40 may be configured to contact the upper and lower rotating elements 38, 39, without using the center axle 22. For example, flywheel elements 40 are shown connected to the upper rotating element 38, and the lower rotating element 39 (shown partially obstructed by the flywheel element 40 connected to the center axle 22). Any number of flywheel elements 40 may be included with any number of rotating elements 30, 38, 39, all of which are considered within the scope of the present disclosure.

The system 10 may further include one or more clutch gears 70 that are mechanically connected to the rotating elements 30, 38, 39. The clutch gear 70 may permit a rotation of the rotating elements 30, 38, 39 it is connected to in a first rotational direction, which is the rotational direction that the motor 14 may initiate. However, the clutch gear 70 may prevent or inhibit a rotation of the rotating elements 30, 38, 39 in a second rotational direction, which opposes the first rotational direction. In other words, the clutch gear 70 prevents the repelling forces of the magnets 20 from rotating the rotating elements 30, 38, 39 backwards, i.e., in a direction opposing the normal rotation of the system 10. Specifically, as the rotating elements 30, 38, 39 are rotating and the magnets 20 thereon are applying forces between the rotating elements 30, 38, 39, one rotating elements 30, 38, 39 may be biased to rotate in the first rotational direction as the neighboring rotating element 30, 38, 39 is biased to rotate in the second rotational direction. The system 10 may be most productive when the sum of the rotating elements 30, 38, 39 is greatest. Therefore, a rotating element 30, 38, 39 rotating in the wrong direction may be a drag on the system 10. An individual clutch gear 70 may be used for each of the rotating elements 30, 38, 39, or more than one rotating element 30, 38, 39 may be connected to a single clutch gear 70, or any combination thereof.

The output device 50 may be connected to the rotating elements 30, 38, 39 to capture the rotational energy of the rotating elements 30, 38, 39, and output the captured energy. Commonly, the output device 50 may include a generator, which converts the rotational energy into an electrical power output. The electrical power output may be stored, transferred, or used in any way. As is shown in FIG. 5, the first rotating element 30 and the lower rotating element 39 are connected to output devices 50. The upper rotating element 38 is not shown connected to an output device 50 for clarity with the illustration. Of course, one output device 50 may be connected to more than one rotating element 30, 38, 39, or one rotating element 30, 38, 39 may be connected to two or more output devices 50, or any combination thereof. Depending on the design of the system 10, including the number of rotating elements 30, 38, 39 and the number of magnets 20, the quantity and placement of the output devices 50 may vary.

Figure 6A:
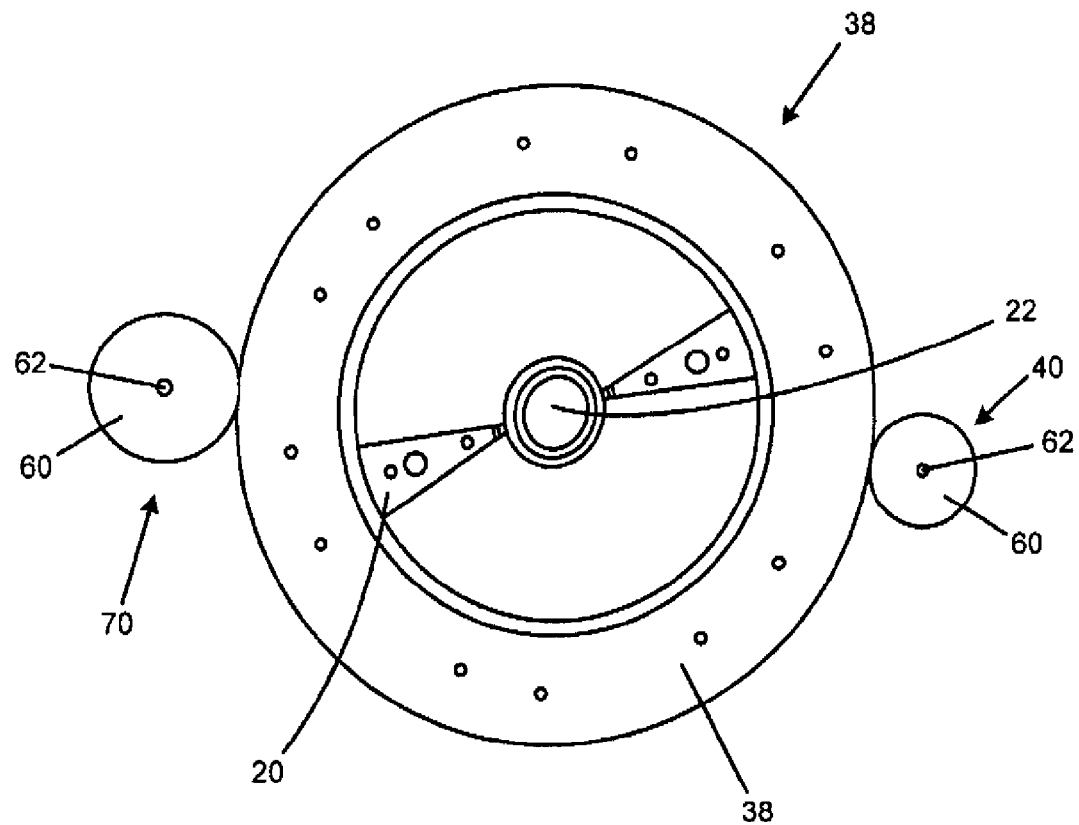
FIGS. 6A-6D are illustrations of a top view of the rotating elements and the flywheel element of the system, in accordance with the first exemplary embodiment of the present disclosure.
Figure 6B:
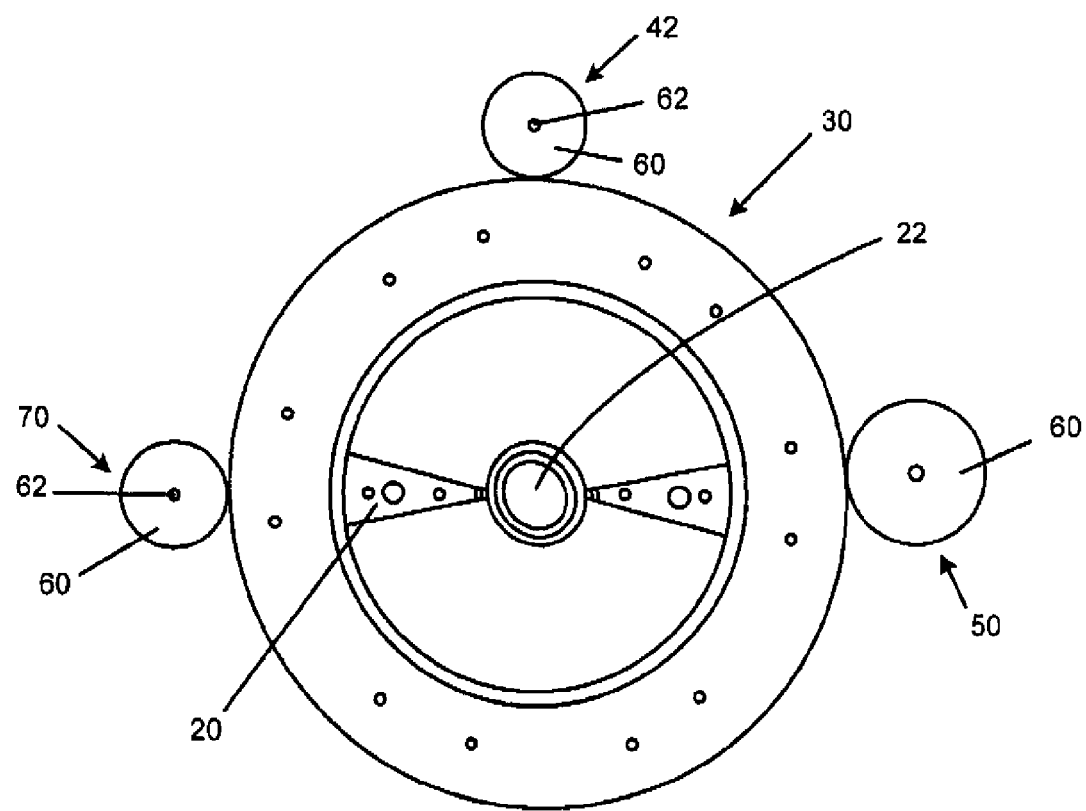
Figure 6C:
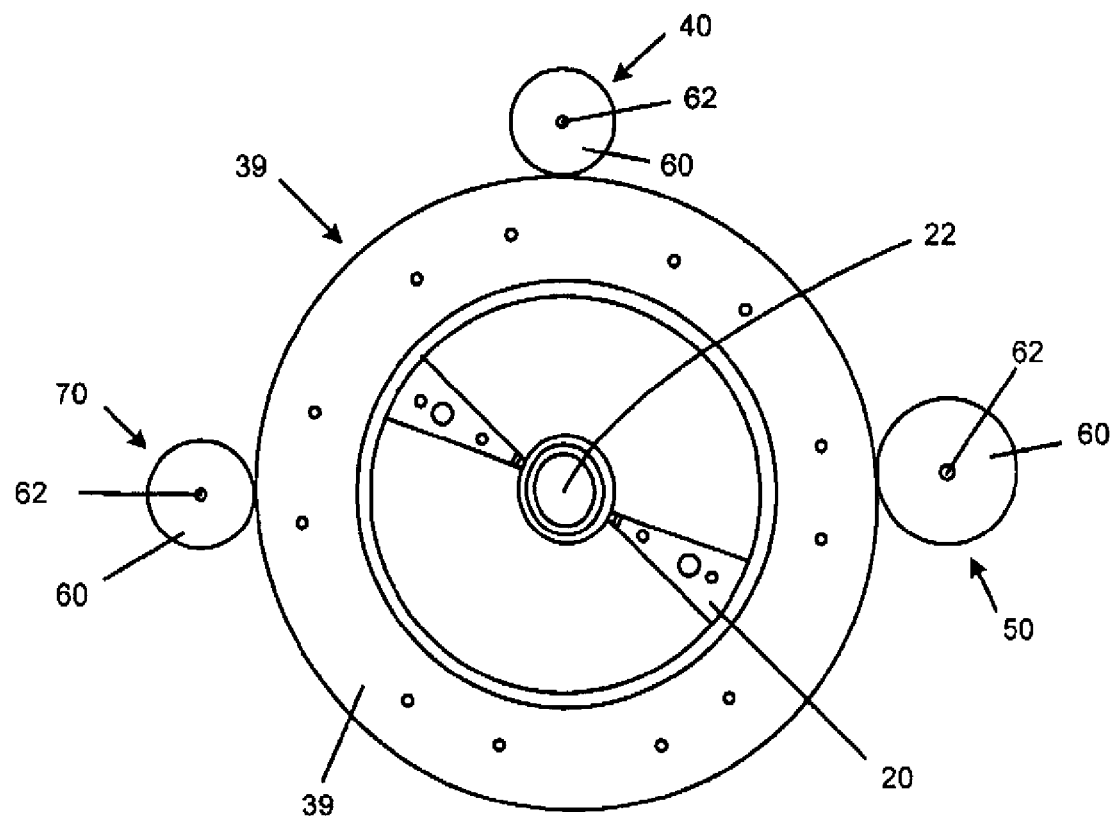
Figure 6D:
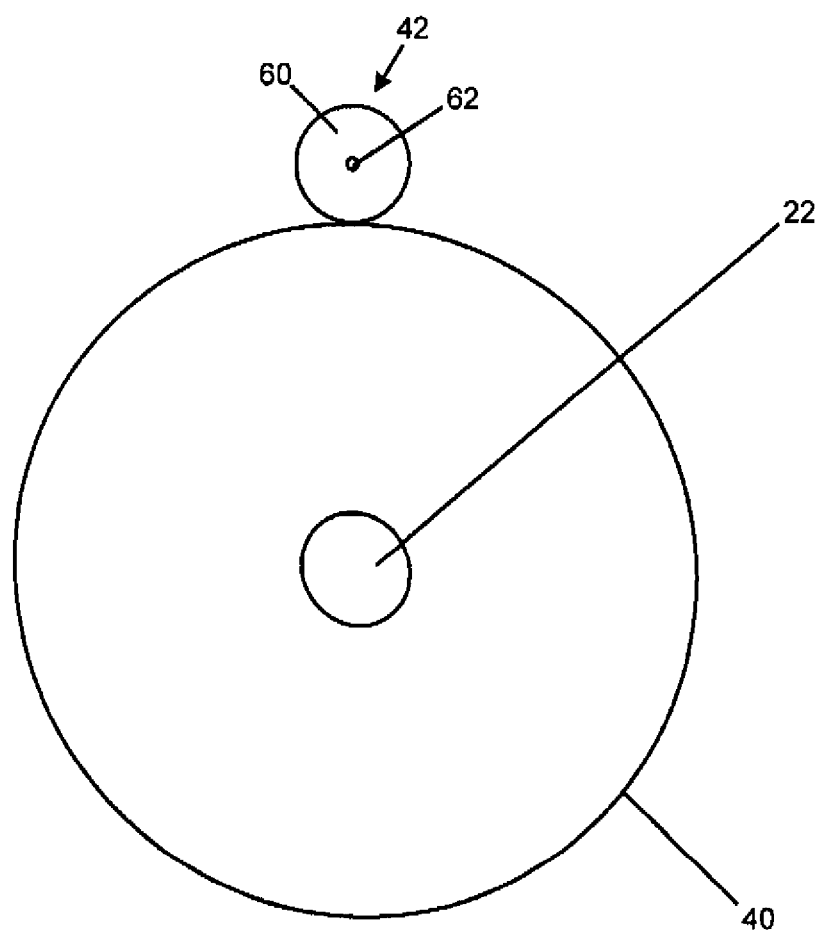

FIGS. 6A-6D are illustrations of a top view of the rotating elements 30, 38, 39 and the flywheel element 40 of the system 10, in accordance with the first exemplary embodiment of the present disclosure. FIGS. 6A-6D show the various components of the system 10 connected each of the rotating elements 30, 38, 39, respectively. For example, in FIG. 6A, the upper rotating element 38 is shown as being supported by the center axle 22 and having two magnets 20 supported by the upper rotating element 38. Connected to the upper rotating element 38 is flywheel element 40 and the clutch gear 70. In FIG. 6B, the first rotating element 30 is shown supported and rotatably connected to the center axle 22, and having two magnets 20 supported thereon. An output device 50 and a clutch gear 70 are connected to the first rotating element 30. Also connected to the first rotating element 30 is a flywheel connection gear 42 that is synced and connected to the flywheel element 40 of FIG. 6D. Thus, the flywheel connection gear 42 of FIG. 6B illustrates an alternative type of connection to a flywheel 40. In FIG. 6C, the lower rotating element 39 is illustrated having two magnets 20 and supported by, but rotatable independent of, the center axle 22. An output device 50, a clutch gear 70, and a flywheel element 40 are connected to the lower rotating element 39. In FIG. 6D, the flywheel element 40 positioned on the center axle 22 and below the lower rotating element 39 of FIGS. 3 & 5 is shown. The flywheel element 40 includes a flywheel connection gear 42 that mechanically connects the flywheel element 40 to the first rotating device 30.

It is noted that any of the components, configurations, or designs disclosed herein may be altered. For example, the system 10 may include any number of rotating elements 30, 38, 39, any number of flywheel elements 40, output devices 50, and clutch gears 70. Also, a variety of mechanical connections and linkages may be used to mechanically connect the components. For example, various sized gears with various sized shafts may transfer a rotation from one component to another. The characteristics of the movements and forces transferred by the mechanical connections may also be altered by the size of the gears, such as with step-up gears or step-down gears. Many supporting structures may also be included to support the overall system 10. For example, the system 10 may be placed on a table with a variety of load-carrying members, which are attached to the components to support their weight or properly position the components. All variations, configurations or designs, even if not explicitly noted herein, are included within the scope of the present disclosure.

Figure 7:
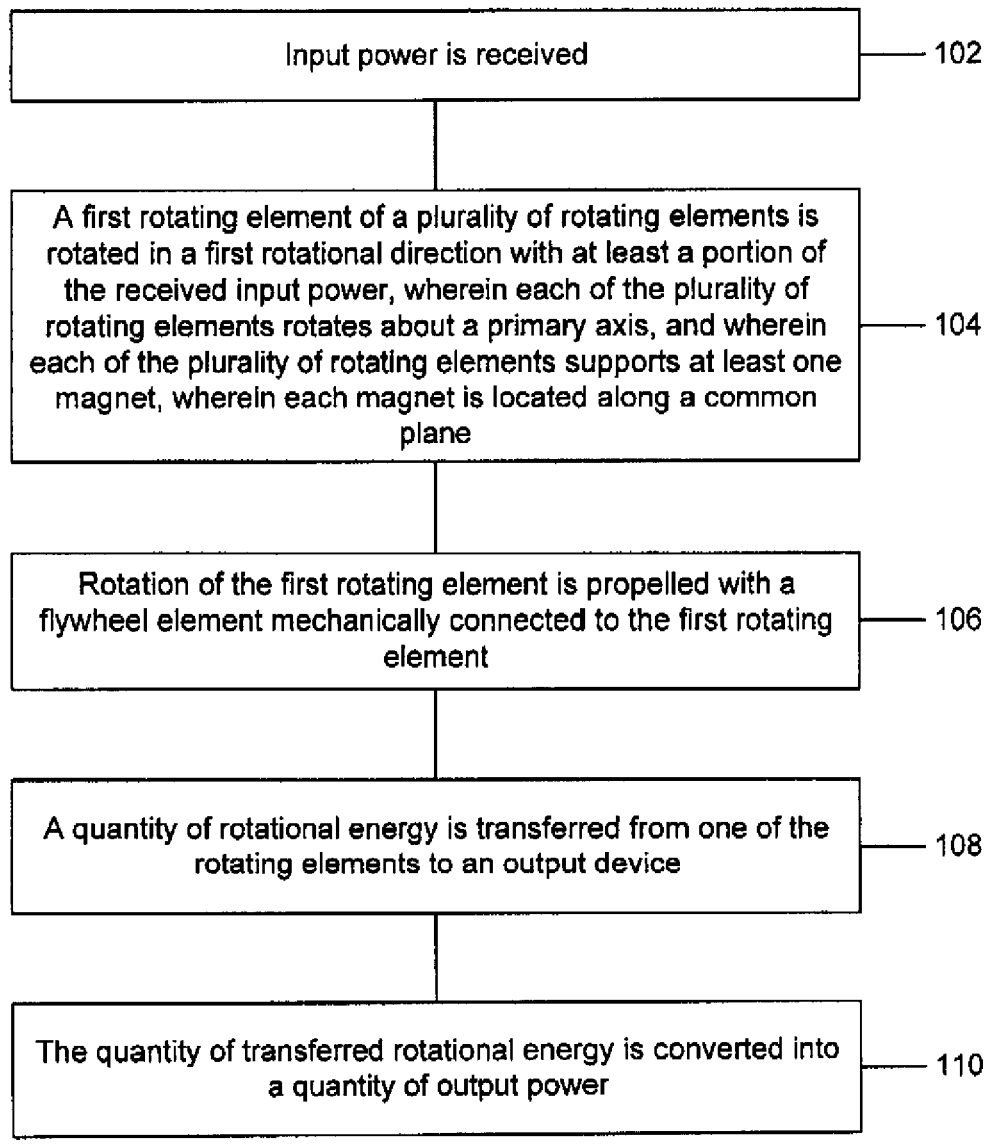
FIG. 7 is an illustration of a flowchart illustrating a method of purifying power using the system of FIG. 1, in accordance with the first exemplary embodiment of the present disclosure.

FIG. 7 is an illustration of a flowchart 100 illustrating a method of purifying power using the system 10 of FIG. 1, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, input power is received. A first rotating element 30 of a plurality of rotating elements 30, 38, 39 is rotated in a first rotational direction with at least a portion of the received input power, wherein each of the plurality of rotating elements 30, 38, 39 rotates about a primary axis 18, and wherein each of the plurality of rotating elements 30, 38, 39 supports at least one magnet 20, wherein each magnet 20 is located along a common plane (Block 104). Rotation of the first rotating element 30 is propelled with a flywheel element 40 mechanically connected to the first rotating element 30 (Block 106). A quantity of rotational energy is transferred from one of the rotating elements 30, 38, 39 to an output device 50 (Block 108). The quantity of transferred rotational energy is converted into a quantity of output power (Block 110).

The method of purifying power may further include any of the steps, processes, or functions described with respect to the first exemplary embodiment and FIGS. 1-6D. For example, the method may include the steps of supporting two magnets with each of the plurality of rotating elements and rotationally spacing the two magnets 180° on center. Any portion of the rotating elements may be supported by the axle but rotatable independent of the axle, whereas flywheel element may be rigidly mounted on the center axle. When the system is in use, the plurality of magnets may be supported by each of the plurality of rotating elements. Each of the plurality of magnets on the plurality of rotating elements may be positioned with like poles opposing each other. A repelling force is increased between two magnets of the plurality of magnets by decreasing the spacing between the two magnets, thereby increasing a rotation of at least one of the plurality of rotating elements.

It should be emphasized that the above-described embodiments of the present disclosure, particularly, any "preferred" embodiments, are merely possible examples of implementations, merely set forth for a clear understanding of the principles of the disclosed system and method. Many variations and modifications may be made to the above-described embodiments of the disclosure without departing substantially from the spirit and principles of the disclosure. All such modifications and variations are intended to be included herein within the scope of this disclosure and protected by the following claims.

What is claimed is:

1. A system for power purification, the system comprising:
    a power source;
    a motor connected to the power source;
    a plurality of rotating elements, each rotatable about a primary axis, wherein each of the plurality of rotating elements supports at least one magnet, wherein each of the magnets is located along a common plane;
    a first rotating element of the plurality of rotating elements mechanically connected to the motor;
    at least one flywheel element mechanically connected to each of the plurality of rotating elements;
    at least one output device mechanically connected to at least one of the plurality of rotating elements; and
    a clutch gear connected to at least one of the plurality of rotating elements, wherein the clutch gear is connected to at least one of the plurality of rotating elements and permits a rotation of the plurality of rotating elements in a first rotational direction and prevents rotation of the plurality of rotating elements in a second rotational direction, wherein the first rotational direction is opposite to the second rotational direction.

2. The system for power purification of claim 1, wherein the output device is a generator.

3. The system for power purification of claim 1, wherein the at least one rotating element further comprises three rotating elements, wherein each of the three rotating elements have two magnets rotationally spaced 180° on center.

4. The system for power purification of claim 1, wherein at least one of the flywheel elements is a mechanical capacitor.

5. The system for power purification of claim 1, further comprising a center axle positioned along the primary axis, wherein the center axle is rigidly connected to the first rotating element and the motor.

6. The system for power purification of claim 5, wherein a first flywheel element of the plurality of flywheel elements is rigidly mounted on the center axle.

7. The system for power purification of claim 1, wherein the at least one magnet further comprises a plurality of magnets, each of the plurality of magnets supported by the plurality of rotating elements, respectively, wherein the plurality of magnets each have two distinct poles, wherein the plurality of magnets are positioned on the plurality of rotating elements with like poles facing each other.

8. A system for power purification, the system comprising:
    a power source;
    a motor connected to the power source;
    a plurality of rotating elements, each rotatable about a primary axis, wherein each of the plurality of rotating elements supports at least one magnet, wherein each of the magnets is located along a common plane;
    a first rotating element of the plurality of rotating elements mechanically connected to the motor;
    at least one flywheel element mechanically connected to each of the plurality of rotating elements; and
    at least one output device mechanically connected to at least one of the plurality of rotating elements, wherein at least a portion of the plurality of rotating elements is a substantially planar disc having an exterior radius and an interior radius, wherein the interior radius defines an open interior portion, wherein the at least one magnet supported by the rotating elements is located within the open interior portion.

9. A method of purifying power, the method comprising:
    receiving input power;
    rotating a first rotating element of a plurality of rotating elements in a first rotational direction with at least a portion of the received input power, wherein each of the plurality of rotating elements rotates about a primary axis, and wherein each of the plurality of rotating elements supports at least one magnet, wherein each magnet is located along a common plane;
    propelling rotation of the first rotating element with a flywheel element mechanically connected to the first rotating element;
    transferring a quantity of rotational energy from one of the rotating elements to an output device;
    converting the quantity of transferred rotational energy into a quantity of output power; and
    positioning the at least one magnet within an interior portion of each of the plurality of rotating elements, respectively, wherein each of the plurality of rotating elements further comprises a substantially planar disc having an exterior radius and an interior radius, wherein the interior portion is defined by the interior radius.

10. The method of claim 9, further comprising the steps of:
    supporting two magnets with each of the plurality of rotating elements; and
    rotationally spacing the two magnets 180° on center.

11. The method of claim 9, further comprising the step of rigidly connecting he first rotating element to a center axle, wherein the center axle is positioned along the primary axis.

12. The method of claim 11, further comprising the step of rigidly mounting the flywheel element on the center axle.

13. The method of claim 9, further comprising the step of:
    supporting a plurality of magnets with each of the plurality of rotating elements, wherein the plurality of magnets each have two distinct poles;
    positioning each of the plurality of magnets on the plurality of rotating elements with like poles opposing each other; and
    increasing a repelling force between two magnets of the plurality of magnets by decreasing a spacing between the two magnets, thereby increasing a rotation of at least one of the plurality of rotating elements.

14. A method of purifying power, the method comprising:
    receiving input power;
    rotating a first rotating element of a plurality of rotating elements in a first rotational direction with at least a portion of the received input power, wherein each of the plurality of rotating elements rotates about a primary axis, and wherein each of the plurality of rotating elements supports at least one magnet, wherein each magnet is located along a common plane;
    propelling rotation of the first rotating element with a flywheel element mechanically connected to the first rotating element;

transferring a quantity of rotational energy from one of the rotating elements to an output device;
converting the quantity of transferred rotational energy into a quantity of output power;
connecting a clutch gear to at least one of the plurality of rotating elements; and
preventing a rotation of the first rotating element in a second rotational direction with the clutch gear, wherein the second rotational direction is opposite to the first rotational direction.

* * * * *